United States Patent [19]

Ichikawa et al.

[11] 4,126,284
[45] Nov. 21, 1978

[54] MAGNETIC TAPE DRIVE DEVICE

[75] Inventors: Hiroki Ichikawa, Hachioji; Kazumi Miyazi, Fuchu; Michio Kusuyama, Hachioji, all of Japan

[73] Assignee: Olympus Optical Co., Ltd., Tokyo, Japan

[21] Appl. No.: 831,130

[22] Filed: Sep. 7, 1977

[30] Foreign Application Priority Data

Sep. 9, 1976 [JP] Japan .......................... 51-121546[U]

[51] Int. Cl.² .......................... G03B 1/04; G11B 15/32
[52] U.S. Cl. .................................................... 242/201
[58] Field of Search ............................... 242/200-204, 242/206, 208-210; 360/71, 73

[56] References Cited

U.S. PATENT DOCUMENTS

| | | | |
|---|---|---|---|
| 3,652,030 | 3/1972 | Nakano | 242/201 |
| 3,785,586 | 1/1974 | Engert et al. | 242/201 |

Primary Examiner—Leonard D. Christian

[57] ABSTRACT

A magnetic tape drive device comprises winding and rewinding reel pedestals and a changeover lever carrying a pulley and a belt which are driven by a motor. The change-over lever is swung by a plunger through a formed spring, so that the pulley or belt is elastically contacted with one of the pedestals to rotate it.

7 Claims, 6 Drawing Figures

MAGNETIC TAPE DRIVE DEVICE

BACKGROUND OF THE INVENTION

This invention relates to a magnetic tape drive device for use in a tape recorder, a reproduce only device etc. and in particular a drive device for selectively effecting tape winding and rewinding operations.

A known magnetic tape drive device of this type includes reel pedestals attached to reel drive shafts respectively provided at the tape winding side and the tape rewinding side. In this device, an idler pulley rotated by a capstan shaft is pressure contacted selectively with these reel pedestals to permit the respective reel drive shafts to be properly selected for rotation in a predetermined direction. In such a known device it is difficult to urge the idler pulley against the reel pedestal normally with a predetermined force. If the urging force is slight, a slip occurs between the idler pulley and the reel pedestal. As a result, a rotation force is not accurately transmitted to the reel pedestal. An excessive urging force leads to increased load on a motor, resulting in overheating or injury.

SUMMARY OF THE INVENTION

It is accordingly an object of this invention to provide a magnetic tape drive device which is simple in construction, operable to properly selectively varying the feed direction of a magnetic tape, capable of positively rotating a reel drive shaft so as to permit an urging force of an idler pulley against a reel pedestal to be kept always constant, and capable of preventing a motor from being overheated or injured.

BRIEF DESCRIPTION OF THE DRAWING

This invention will be more fully described by way of example by reference to the accompanying drawings in which.

DETAILED DESCRIPTION OF THE PREFERRED EMBODIMENTS

One magnetic tape drive device will be explained by reference to FIGS. 1 to 4 jointly.

Figure 1:
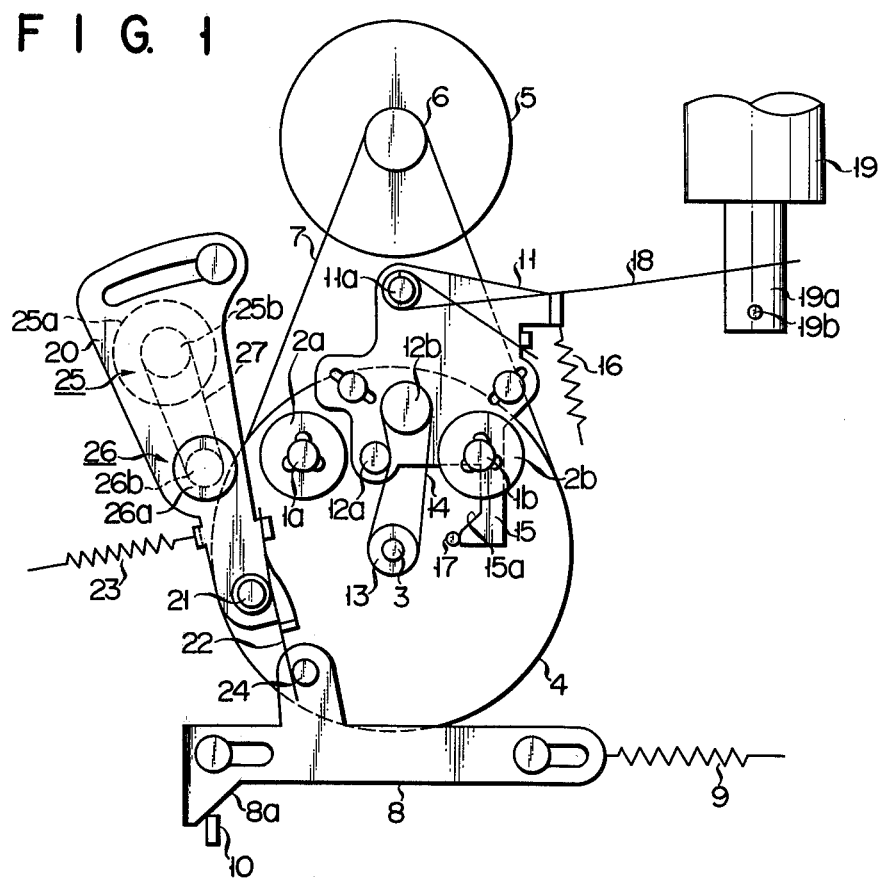
FIGS. 1 to 4 are plan views, each showing a different operative state of a magnetic tape drive device according to one embodiment of this invention.
Figure 2:
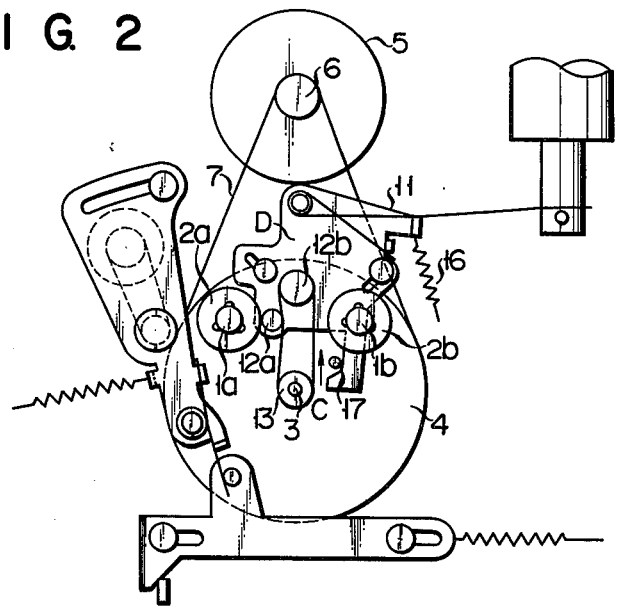
Figure 3:
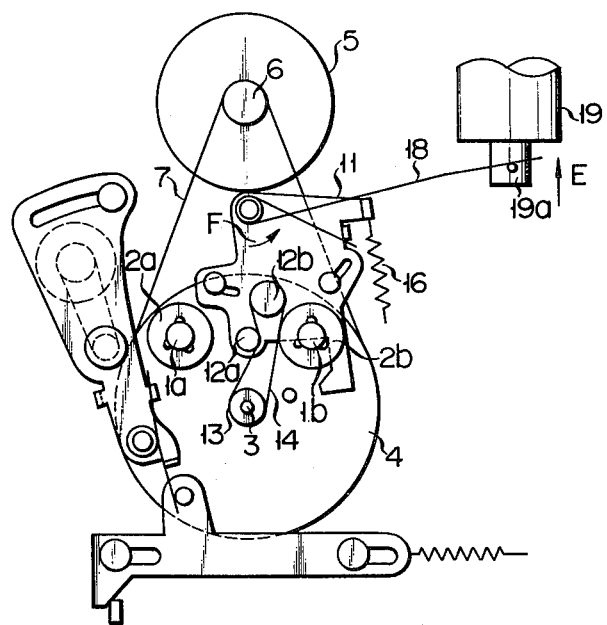
Figure 4:
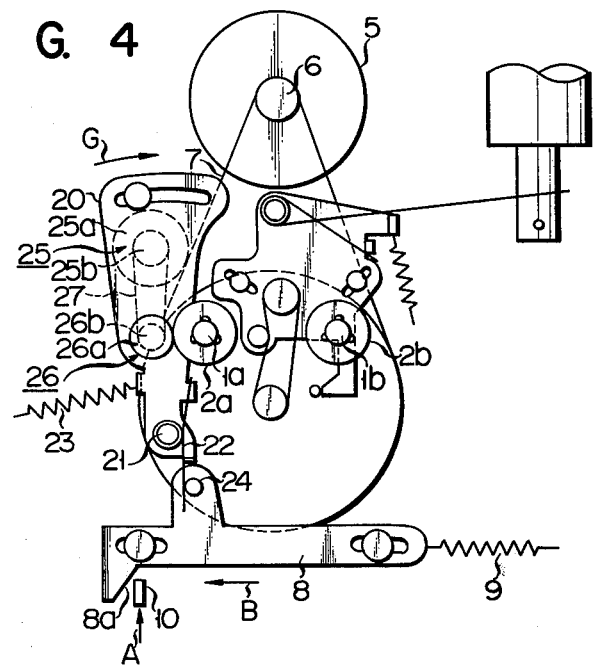

In FIG. 1, reference numeral 1a is a reel drive shaft on the tape winding side and 1b is a reel drive shaft on the tape rewinding side. The drive shafts 1a and 1b are rotatably journalled at a predetermined interval on a fixed base not shown and have reel supports or pedestals 2a and 2b, respectively, at the respective bases. A capstan shaft 3 is disposed at equal distances from the drive shafts 1a and 1b and rotatably inserted through the base and a flywheel/pulley 4 is coaxially fixed to the lower end portion of the capstan shaft 3. A motor 5 is located a predetermined distance away from the flywheel/pulley 4. A pulley 6 is mounted on the rotation shaft of the motor and an endless belt 7 is placed between the pulley 6 and the flywheel/pulley 4. The flywheel/pulley 4 is rotated by driving the motor 5. A changeover lever 11 has one end pivoted on a shaft 11a projected from the base and is swingable with the shaft 11a as a center. A pair of idler pulleys 12a, 12b are mounted at a predetermined interval on the upper surface of the changeover lever 11. The pulley 12a is disposed on the free end portion of the changeover lever 11 and the pulley 12b is disposed on the substantially central portion of the change-over lever 11. An idler pulley 13 is coaxially mounted on the capstan shaft 3. An endless belt 14 is entrained between the pulley 12b on the changeover lever 11 and the pulley 13. The pulley 12a is pressure contacted with the outer surface of the belt 14. In consequence, the idler pulleys 12a and 12b are mutually reversely rotated by the rotation of the capstan shaft 3. A horizontal projection 15 is provided on the free end portion of the changeover lever 11 and has an inclining cam surface 15a. An actuating pin 17 is positioned to correspond to the cam surface 15a of the projection 15. The actuating pin 17 is abutted against a known operating member so as to be moved in a direction of an arrow C in FIG. 2 (in the forward direction) during the playing operation. A tension spring 16 has one end fixedly mounted on the base and the other end connected to the changeover lever 11. The spring 16 causes the lever 11 to be swingably urged normally in clockwise direction i.e. in the direction of an arrow D in FIG. 2 to permit the cam surface 15a of the projection 15 of the lever 11 to be elastically urged toward the actuating pin 17. When the actuating pin 17 is moved in a direction of an arrow C in FIG. 2 the cam surface 15a of the projection 15 is followed, causing the changeover lever 11 to be swung in the clockwise direction to permit the pulley 12a on the lever 11 to be pressure contacted with the reel pedestal 2a on the tape winding side as shown in FIG. 2. A formed wire or spring 18 has its central portion wound on the central rotation shaft of the changeover lever 11. The wire 18 has one end fixedly secured to the lever 11. The other end of the wire 18 extends outwardly and terminates at a movable iron core 19a of an electromagnetic plunger 19. The electromagnetic plunger 19 is of a known type which is excited in connection with a tape rewinding operation (REW operation). A projection 19b is provided on the forward end portion of the movable iron core 19a of the plunger 19. During the inactivation of the plunger 19 as shown in FIG. 1 there is a small distance between the projection 19b and one end of the formed wire 18. In consequence, no inconvenience is encountered when the changeover lever 11 is swung clockwise incident to the forward movement of the projection 17. During the REW operation the plunger 19 is excited, causing the movable iron core 19a to be moved in the direction of an arrow E to cause the spring 18 to be swung in the counterclockwise direction with the shaft 11a as a center through the projection. As a result, the changeover lever 11 is swung in the F direction (FIG. 3) against urging force of the spring 16 to permit the endless belt 14 to be pressure contacted with the reel pedestal on the tape rewinding side.

As will be appreciated from the foregoing, with the changeover lever 11 in the neutral position shown in FIG. 1 the winding and rewinding reels are both in the inoperative position. Upon the movement of the operating projection 17 as shown in FIG. 2 the winding reel is rotated. When the plunger 19 is energized into the position shown in FIG. 3 the rewinding reel is driven. Because the changeover lever 11 is swung by the spring 16 or 18, the pulley 12a and endless belt 14 are spring-urged into abutting engagement with the reel pedestal 2a and reel pedestal 2b, respectively. The return movement of the operating projection 17 causes the changeover lever 11 to move in the original position as shown in FIG. 1.

In FIG. 1, reference numeral 20 is a speed change lever which has one end rotatably mounted on the base through a shaft 21. The central portion of a formed wire or spring 22 is wound on the shaft 21. The formed wire 22 has one end engaged with the lever 20 and the other end extended outwardly. A tension spring 23 has one end fixedly connected to the base and the other end connected to the lever 20, causing the lever 20 to be normally urged in the counterclockwise direction. An extending end of the formed wire 22 is urged by the spring 23 into abutting engagement with an engaging pin 24 which is projected from an operating plate 8. The operating plate 8 can be laterally moved with respect to the base. A tension spring 9 is disposed between the base and the operating plate 8 and normally urges the plate 8 in the right direction. An inclining edge 8a is provided on the portion of the operating plate 8 and, when a tape fast-feed operating lever (FF operating lever) 10 is pushed in a direction of an arrow A in FIG. 4, the operating lever 10 is slidingly contacted with the inclining edge 8a of the operating plate 8 and moved left (i.e. in the direction of an arrow B in FIG. 4) against the urging force of the spring 9. During the tape fast-feed time the operating plate 8 is moved in the direction of an arrow B and in consequence the speed change lever 20 is swung in the direction of an arrow G through a spring 23.

First and second pulley groups 25 and 26 are rotatably supported by the speed change lever at a predetermined interval. The first pulley group 25 comprises a large-diameter pulley 25a positioned on the lower surface side of the lever 20 and a small-diameter pulley 25b mounted coaxial with the large-diameter pulley 25a which confronts the endless belt 7. The second pulley group 26 comprises a large-diameter pulley 26a positioned on the upper surface side of the lever 20 and a small-diameter pulley 26b mounted coaxial with the large-diameter pulley 26a which confronts the reel support 2a on the winding side. The first and second pulley groups 25 and 26 are drivingly connected to each other through an endless belt 27 placed between the small-diameter pulleys 25b and 26b provided on the lower surface side of the lever 20, respectively.

When the FF operation is effected the motor 5 is rotated. The movement of the FF operating lever 10 in the direction of the arrow A causes the operating plate 8 in the direction of the arrow B, pushing one end of the formed wire 22 through the engaging pin 24 in the same direction to cause the lever 20 to be swung in the direction of the arrow G with the shaft 21 as a center. By so doing, the second pulley group 26 supported on the lever 20 is pressure contacted with the tape winding side reel support 2a, while the first pulley group 25 is pressure contacted with the endless belt 7 from outside. The rotation force of the motor 5 is transmitted to the reel drive shaft 1a through the pulley 6, endless belt 7, the first pulley group 25, endless belt 27, the second pulley group 26 and reel support 2a. As a result, a magnetic tape in a cassette is wound at fast speeds on one reel. Even in the FF operation the speed change lever 20 is elastically driven by the springs 22 and 23. In consequence, the pulley groups 25 and 26 are elastically abutted against the endless belt 7 and reel support or seat 2a, respectively, permitting these springs to have predetermined spring constants. In this way, the abutting forces are maintained optimal. This condition is not influenced by the other operation such as the operation by the operation lever, operation button, etc.

Figure 5:
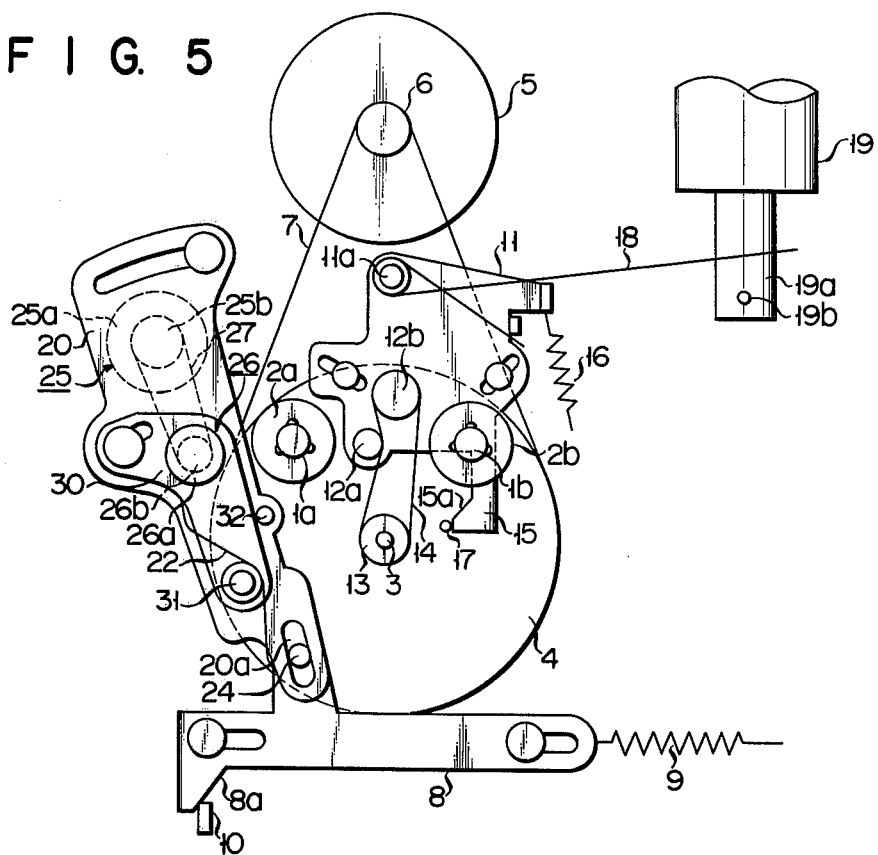
FIG. 5 is a plan view showing a magnetic tape drive device according to another embodiment of this invention.

In a modification shown in FIG. 5 an operating lever 8 is not designed to move a formed wire 22 directly, but designed to directly move an auxiliary lever 30, causing pulley groups 25 and 26 to be elastically contacted with an endless belt 7 and reel support 2a, respectively, by the formed wire 22 elastically connected between the lever 30 and a changeover lever 20. In FIG. 5 the central portion of the changeover lever 20 is pivotally supported by a pin 31 which is mounted uprightly on a base and can be swung with the pin 31 as a center. A slit 20a is provided in one end of the lever 20 and an engaging pin 24 on the operating lever 8 is loosely inserted through the slit 20a of the lever 20, and the operating plate 8 is mechanically connected to the changeover lever 20 to permit the latter to be swung according to the movement of the operating plate 8. The auxiliary lever 30 is pivotally supported on the upper surface of the changeover lever 20 to permit the lever 30 to be swung with the pin 31 as a center. The formed wire or spring 22 has its central portion wound on the pin 31. The formed wire 22 is connected at one end to the auxiliary lever 30 and at the other end to the changeover lever 20, causing the auxiliary lever 30 to be urged normally in the clockwise direction. A stop pin 32 is projected on the changeover lever 20 and abutted against one end portion of the auxiliary lever 30, restricting the clockwise rotation of the auxiliary lever with respect to the changeover lever 20. The pulley group 25 is rotatably supported on the changeover lever 20 and the pulley group 26 is rotatably supported on the auxiliary lever 30. An endless belt 27 is placed between the pulley groups 25 and 26 to permit the latter to be rotatably driven.

When the operating plate 8 is moved left against the urging force of the spring 9, the changeover lever 20 is swung clockwise with the shaft 31 as a center, permitting the auxiliary lever 30 to be disengaged from the stop pin 32. As a result, the auxiliary lever 30 is swung clockwise under the urging force of the spring 22 to cause a large-diameter pulley 26a to be elastically contacted with a reel support 2a. At this time, a large-diameter pulley 25a supported on the changeover lever 20 is contacted with an endless belt 7, thus obtaining an FF operation state.

Figure 6:
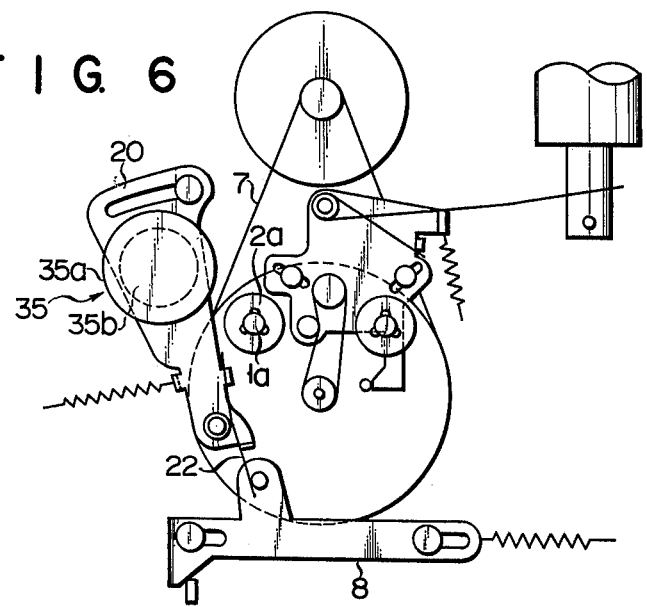
FIG. 6 is a plan view showing a magnetic tape drive device according to another embodiment of this invention.

In a modification shown in FIG. 6 a single pulley group 35 is rotatably mounted on a changeover lever 20. When an operating plate 8 is moved for the FF operation, the lever 20 is swung clockwise through a formed wire 22 to cause a large-diameter pulley 35a and small-diameter pulley 35b to be elastically contacted with a reel base 2a and endless belt 7, respectively. As a result, an FF connection is attained.

Although in the above-mentioned embodiment the formed wire have been used as a pulley pressure contact means (during the FF operation), use can be made of the other elastic connection member such as a coil spring.

What we claim is:

1. A magnetic tape drive device including a drive shaft for a tape winding reel, a drive shaft for a tape rewinding reel, reel pedestals provided on both the drive shafts, respectively, a drive source for reel pedestal rotation, transmitting means for selectively transmitting a drive force from the drive source to the reel pedestals, and a first operating member for operating said transmitting means, said transmitting means comprising a rotatable changeover lever, a transmission force changeover mechanism mounted on the changeover lever and adapted to selectively contact with the reel pedestals according to the rotation of the changeover lever to transmit a drive force from the drive source to the reel pedestal, and an elastically connecting means for elastically connecting the changeover lever to the first operating member to permit the transmission force changeover mechanism to be elastically contacted with the reel pedestal through the changeover lever according to the operation of the first operating member, said transmission force changeover mechanism including a first pulley rotatably supported on the changeover lever, an endless belt placed between the first pulley and the drive source to permit the first pulley to be rotated, a second pulley rotatably supported on the changeover lever to permit it to be contacted with the endless belt, in which said second pulley is rotated in a direction opposite to that in which said first pulley is rotated, and said second pulley and endless belt are selectively elastically connected through the elastically connecting means to the corresponding reels, respectively.

2. The magnetic tape drive device according to claim 1, in which said elastically connecting means is a formed wire.

3. The magnetic tape drive device according to claim 1, which further includes a rotation speed changeover mechanism for permitting one of the reel pedestals to be selectively switched between a high speed rotation and a low speed rotation.

4. The magnetic tape drive device according to claim 3, in which said rotation speed changeover mechanism comprises a second operating member, a speed changeover lever, a spring for elastically connecting the speed change lever to the second operating member, and a pulley group rotatably mounted on the speed change lever and moved, by the speed change lever swung through the spring by virtue of the second operating member, into elastic engagement with one of the reel pedestals to cause the reel pedestal to be rotated at high speed.

5. The magnetic tape drive device according to claim 3, in which said rotation speed changeover mechanism comprises a second operating member, a first speed change lever connected to the second operating member, a second speed change lever pivotably mounted on the first speed change lever, a spring for elastically connecting the second speed change lever to the first speed change lever, a pulley group rotatably mounted on the speed change levers and moved, by the change levers swung through the spring by virtue of the second operating member, into elastic engagement with one of the reel pedestals to cause the reel pedestal to be rotated at high speed.

6. The magnetic tape drive device according to claim 1 which further includes biasing means to normally urge the rotatable changeover lever in one rotating direction, the operating member rotating the rotatable changeover lever in the opposite direction against the urging force of the biasing means.

7. The magnetic tape drive device according to claim 6 in which said biasing means includes a tension spring.

* * * * *